UNITED STATES PATENT OFFICE.

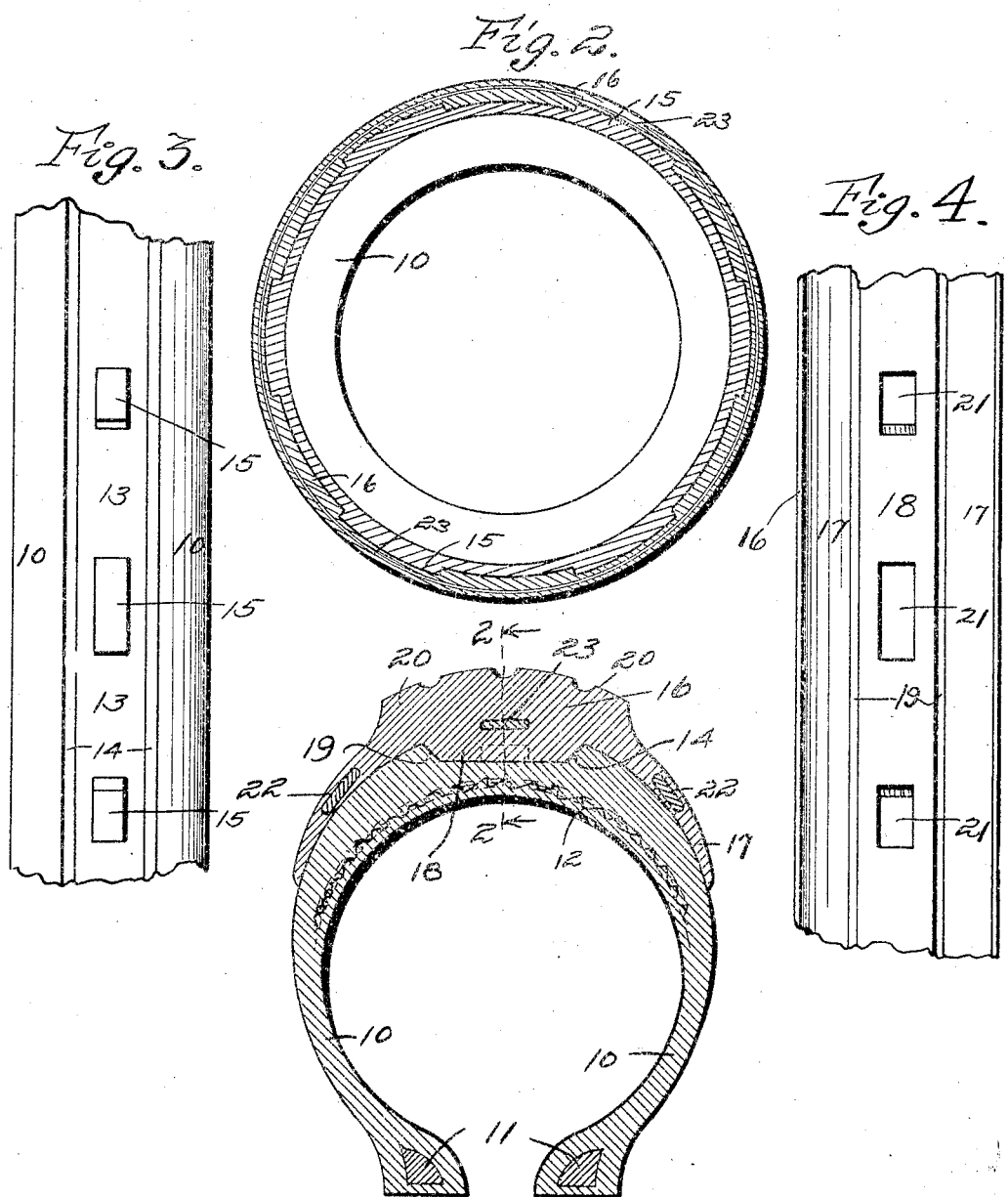

GEORGE F. ROTH, OF DES MOINES, IOWA.

AUXILIARY TREAD FOR PNEUMATIC TIRES.

1,391,412.  Specification of Letters Patent.  Patented Sept. 20, 1921.

Application filed July 9, 1920. Serial No. 394,909.

*To all whom it may concern:*

Be it known that I, GEORGE F. ROTH, a citizen of the United States, and resident of Des Moines, in the county of Polk and State of Iowa, have invented a certain new and useful Auxiliary Tread for Pneumatic Tires.

The object of my invention is to provide an auxiliary tread adapted to be used in combination with a tire casing of a pneumatic tire.

More particularly it is my object to provide a device in combination with a pneumatic tire casing, an auxiliary tread member adapted to be placed in position when the tire is deflated, and when once installed and the pressure is applied to the tire, or it is inflated, the tread member will become locked and held in position against movement relative to the tire casing, due to the pressure of air within the tire.

Still another object is to provide in combination with a tire casing, an auxiliary tread member adapted to cover a portion of the outer surface of a tire casing. The tread member being provided with members adapted to co-act with the tire casing so as to prevent slippage of the tread member relative to the casing.

Still another object is to provide an auxiliary tread member, having a series of annular reinforcing bands, embedded in the tread member and adapted to limit the circumference of the tread member when it is installed in position on a tire casing.

Still a further object is to provide a device that may be readily and easily installed upon a tire casing, and when it becomes worn, a new one may be substituted without the necessity of installing an entirely new casing.

It will also be understood that I may make the tread member of what may be called the "non-skid" type or of the smooth type of pneumatic tire casings.

Still another object is to provide the tread member with outwardly curved sides, so as to partially over-lap the tire casing, the parts being so arranged that when the tire is deflated the tread member may be placed in position, and when inflated, the tread member may be held against sideward movement, due to the pressure within the tire casing.

With these and other objects in view, my invention consists in the construction, arrangement and combination of the various parts of the device, whereby the objects contemplated are attained as hereinafter more fully set forth, pointed out in my claim, and illustrated in the accompanying drawings, in which:

Figure 1 shows a central, sectional view, taken through a tire casing, with my tread device installed thereon.

Fig. 2 shows a central, sectional view through the tire and tread member, taken on the line 2—2 of Fig. 1.

Fig. 3 shows a top or plan view of a portion of the casing, designed to be used with my tread member; and Fig. 4 is a view of the under side of a portion of the tread member.

In the accompanying drawings, I have used the reference numeral 10 to indicate an ordinary tire casing, which is provided with the reinforcing members 11, and the fabric 12.

The upper center portion of the casing 10, is provided with an annular recess 13, which is provided with the upwardly and outwardly inclined sides 14.

Formed on the bottom of the recess 13, are the upwardly extending lugs 15, which are adapted to co-act with the tread member, which will hereinafter be more fully described.

My tread member, referred to by the numeral 16, is provided with the downwardly and outwardly curved sides 17, which are designed to rest against the contour of the outer surface of the tire casing 10.

It will be understood that my tread member 16 is made of rubber, or other suitable resilient material, so as to easily conform to the tire casing.

The tread member 16 is provided on its under side with an annular rib 18, which is received within the recess 13 of the casing 10. The rib 18 is provided with the inclined sides 19, which co-act with, and rest against the inclined sides 14 of the recess 13.

The tread member 16 may be provided with non-skid portions 20 of any design. The rib 18 is provided with a plurality of small recesses 21, which receive the lugs 15 on the bottom of the recess 13.

When the lugs 15 are received within the recesses 21, it will be seen that sliding or rotary movement of the tread member 16 relative to the tire casing 10 will be prevented.

The rib 18, which is received within the recess 13 within the casing 10 and the curved sides 17 of the tread member will prevent any possible sideward movement of the tread member 16, relative to the casing 10, when the air within the casing is slightly diminished otherwise the full amount of air within the casing will tend to hold the tread onto the casing.

The co-acting of the lugs 15 with the recesses 21 will also prevent any possible sideward movement of the parts relative to each other. In order to reinforce the resilient or flexible material that makes up the tread member 16 I have provided the reinforcing annular bands or members 22.

The bands 22 are each embedded in the curved sides 17 of the tread member 16. A reinforcing band 23 is also provided in the tread member mid-way between the reinforcing bands 22.

The purposes of the reinforcing bands 22 and 23 are, first to reinforce the tread member 16, and second to limit the circumference of the tread member when the pressure is applied within the tire casing 10.

In the installing of my device, the tire casing 10 is deflated, whereby the curved side 17 of the tread member may be forced or slid over the casing 10, until the lugs 15 and the recesses 21 register with each other, and the rib 18 is received within the recess 13. When the parts are in this position, and the air pressure is applied within the tire 10, then the tire 10 will be forced outwardly until it rests securely against the inner surface of the tread member 16.

The tread member 16 is of resilient material, so as to easily conform to the contour of the tire casing, even though there were any slight inaccuracies of the parts. It will be seen that when the pressure is applied to the tire, that the reinforcing bands 22 and 23 will limit the outward movement of the tread member and its circumference.

My tread device may be installed upon an especially designed tire, or may be used as an attachment, or may be used upon an ordinary tire casing, by slightly remodeling it.

It will be seen from the construction of the parts just described that a great deal of tire expense will be saved by the use of my device, and that a tread member may be installed upon the same tire casing a great many times because there is practically no wear on the casing 10.

My device is very simple to install, comparatively cheap and is very effective in saving the tire cost. Yet the use of my tread member will in no way affect the beauty of the ordinary tire casings, and will be practically unnoticeable when once installed and in use.

Some changes may be made in the construction and arrangement of the parts of my improved auxiliary tread for pneumatic tire, without departing from the real spirit and purpose of my invention, and it is my intention to cover by my claim any modified forms of structure or use of mechanical equivalents which may be reasonably included within their scope.

I claim as my invention:

In a device of the class described, the combination of a pneumatic tire casing, having in its exterior tread surface an annular groove of substantial width extending circumferentially entirely around the casing, an annular protective tread member for said casing, having a central, substantially thick portion provided with an inwardly extending rib received in said groove, said groove and rib being provided with lugs and recesses adapted to co-act with each other, said thick portion being slightly wider than said groove, said tread member having relatively thin portions extending partly around the casing on each side thereof, a resilient substantially flat band received in said thicker portion of said tread member radially outwardly from said lugs and recesses, and resilient annular bands received in the thinner portions of said tread members.

Des Moines, Iowa, July 2, 1920.

GEORGE F. ROTH.